(12) United States Patent
Mochizuki

(10) Patent No.: US 10,352,727 B2
(45) Date of Patent: Jul. 16, 2019

(54) POSITION FORECASTING APPARATUS AND POSITION DETECTION APPARATUS

(71) Applicant: TDK Corporation, Tokyo (JP)

(72) Inventor: Shinichirou Mochizuki, Tokyo (JP)

(73) Assignee: TDK Corporation, Tokyo (JP)

( * ) Notice: Subject to any disclaimer, the term of this patent is extended or adjusted under 35 U.S.C. 154(b) by 3 days.

(21) Appl. No.: 15/805,289

(22) Filed: Nov. 7, 2017

(65) Prior Publication Data

US 2018/0283903 A1 Oct. 4, 2018

(30) Foreign Application Priority Data

Mar. 28, 2017 (JP) .................................. 2017-62065

(51) Int. Cl.
| | |
|---|---|
| *G01B 7/30* | (2006.01) |
| *G01D 5/14* | (2006.01) |
| *G01D 5/16* | (2006.01) |
| *G01P 3/487* | (2006.01) |
| *G01D 5/244* | (2006.01) |

(52) U.S. Cl.
CPC ................. *G01D 5/16* (2013.01); *G01B 7/30* (2013.01); *G01D 5/145* (2013.01); *G01P 3/487* (2013.01); *G01D 5/24495* (2013.01)

(58) Field of Classification Search
CPC .......... G06F 1/00; G06F 2101/00; G01D 1/00
See application file for complete search history.

(56) References Cited

U.S. PATENT DOCUMENTS

| 5,721,546 A | 2/1998 | Tsutsumishita |
| 2005/0288907 A1 | 12/2005 | Kulczyk et al. |

| 2006/0071659 A1 | 4/2006 | Tatschi et al. | |
| 2006/0267529 A1 | 11/2006 | Piefer et al. | |
| 2010/0300387 A1* | 12/2010 | Hu | F01L 1/047 123/90.17 |
| 2010/0308804 A1* | 12/2010 | Ghislanzoni | G01D 1/00 324/207.23 |
| 2010/0308808 A1* | 12/2010 | Yamagata | G01D 1/00 324/207.25 |
| 2013/0113470 A1* | 5/2013 | Kegeler | G01B 7/30 324/207.25 |

(Continued)

FOREIGN PATENT DOCUMENTS

| DE | 19540106 A1 | 10/1996 |
| DE | 102004046803 A1 | 4/2006 |

(Continued)

OTHER PUBLICATIONS

English translation of German Office action dated Mar. 15, 2018 issued in corresponding DE patent application No. 102017126610.0.

*Primary Examiner* — Jermele M Hollington
*Assistant Examiner* — Temilade S Rhodes-Vivour
(74) *Attorney, Agent, or Firm* — Posz Law Group, PLC

(57) ABSTRACT

A position forecasting apparatus for forecasting a position at a predetermined time of a continuously operating moving body is provided with an estimation part that finds an estimated position state of the moving body at a time in the past before the predetermined time and a position forecasting part that forecasts the position of the moving body at the predetermined time based on the estimated position state of the moving body estimated by the estimation part.

5 Claims, 9 Drawing Sheets

(56) References Cited

U.S. PATENT DOCUMENTS

2013/0138236 A1* 5/2013 Nagaoka ................ G05B 19/19
                                                    700/108
2015/0077093 A1* 3/2015 Saito ........................ G01D 5/12
                                                    324/207.13

FOREIGN PATENT DOCUMENTS

| DE | 102016101245 A1 | 9/2016 |
|----|-----------------|--------|
| JP | 2008-116292 A | 5/2008 |
| JP | 2008-116300 A | 5/2008 |
| JP | 2010-173373 A | 8/2010 |
| JP | 2016-186475 A | 10/2016 |
| WO | 2016204205 A1 | 12/2016 |

* cited by examiner

POSITION FORECASTING APPARATUS AND POSITION DETECTION APPARATUS

CROSS REFERENCE TO RELATED APPLICATIONS

The present application is based on Japanese Patent Application No. 2017-62065 filed on Mar. 28, 2017, the disclosure of which is incorporated herein by reference.

FIELD OF THE INVENTION

The present invention relates to an apparatus for forecasting position through operation of a moving body, and an apparatus for detecting position through operation of the moving body.

BACKGROUND OF THE INVENTION

Conventionally, a position detection apparatus that detects a position of a moving body such as a servo motor or the like attached to a machine moving part in a machine tool or the like by detecting changes in a physical quantity caused by rotational movement or the like of the moving body has been used. Through the output from this position detection apparatus, the rotational movement or the like of the moving body is continuously tracked, and by providing feedback to the moving body, movement control of the moving body is accomplished.

As this kind of position detection apparatus, an apparatus that is provided with a magnetic field generation part for generating a magnetic field and a magnetic detection apparatus is known. This magnetic detection apparatus, in general, is provided with a magnetic detection element, which detects an external magnetic field generated by the magnetic field generation part and outputs an analog signal indicating a physical quantity that the magnetic field generation part has relatively moved, and a calculation circuit, which can convert the analog signal into a digital signal and compute the position of the moving body at the present time based on this digital signal. This magnetic detection apparatus is configured as an integrated circuit in which the magnetic detection element and the calculation circuit are integrated on the same semiconductor chip.

Movement control of the moving body is accomplished based on the position information of the moving body at the present time computed in the calculation circuit of this magnetic detection apparatus. However, delays can arise from the filtering process for the analog signal output from the magnetic detection element, the process of converting the analog signal into a digital signal, the filtering process for removing noise included in this digital signal and the process of computing the position of the moving body at the present time based on the digital signal. Consequently, particularly to precisely control movement of a moving body operating at high speed and to make up for the delay, a method that forecasts the position of the moving body at a future time from the position information of the moving body and controls the moving body on the basis of this forecasted value is adopted.

As a position detection apparatus capable of implementing this kind of method, conventionally, a rotation detection apparatus that includes a magnetic sensor element that measures the magnetic field strength of magnets provided in a rotating body, an angle calculation means for calculating the rotation angle of the magnets from the measured value of the magnetic sensor element, a storage means for storing the data of the rotation angle output from the angle calculation means, a rotational state estimation means for estimating the rotational state through statistical processing of the contents stored in the storage means, an extrapolation processing means for forecasting later rotational angles from the rotational state estimated by the rotational state estimation means, and an output means for calculating and outputting a rotational angle based on the rotational angle forecast by the extrapolation processing means have been proposed. (see Patent Literature 1).

PRIOR ART

Patent Literature

[PATENT LITERATURE 1] JP Laid-Open Patent Application No. 2008-116292.

SUMMARY OF THE INVENTION

Problem to be Solved by the Invention

In the rotation detection apparatus disclosed in the above-described Patent Literature 1, the angle at the present time is output with a fixed sampling period by the magnetic sensor element, and is stored and accumulated in the storage means. Furthermore, processing such as an averaging filter or the like is accomplished on the past angle data that reaches the angle data of the present time stored and accumulated in the storage means, and an angle at a sampling time to be forecast (forecast angle) is found.

Predetermined noise is included in the angle data of the present time output at a fixed sampling period by the magnetic sensor element. When the forecast angle is found through a linear extrapolation process as in the above-described Patent Literature 1 using angle data that includes such noise, there is a problem in that the accuracy of the forecast angle decreases. As is clear from the forecasting model shown in FIG. 14, the angle $\theta_X$ at a prescribed sampling time $T_X$ and the angle $\theta_{X-1}$ at a sampling time $T_{X-1}$ more in the past each includes predetermined noise (in FIG. 14, an arrow indicates the noise width), and when making a linear extrapolation forecast of a forecast angle $\theta_{X+1}$ at a sampling time $T_{X+1}$ more in the future from the predetermined time $T_X$ using these items of angle data, the noise included in the forecast angle $\theta_{X+1}$ is amplified more than the noise included in the angles $\theta_X$ and $\theta_{X-1}$.

In addition, when trying to find a forecast angle through an averaging filter process or the like using the above-described angle data, a group delay caused by such occurs, and it is necessary to set the sampling time to be forecast further in the future. When the sampling time to be forecast is set further in the future, it is impossible to control noise amplification, creating the problem that the accuracy of the forecast angle decreases.

To increase the accuracy of the forecast angle, it is conceivable to process by a filter circuit or the like the angle data output by the magnetic sensor element to reduce the noise included in the angle data. Through processing by a filter circuit or the like, it is possible to reduce the noise included in the angle data. However, more delays occur through processes by filter circuits or the like, so the sampling time to be forecast must be set further in the future. When the sampling time to be forecast is set further in the future in this manner, the noise reduced by the filter circuit or the like is again amplified and included in the forecast angle. Consequently, the accuracy of the forecast angle decreases.

In consideration of the above problem, it is an objective of the present invention to provide a position forecasting apparatus that can forecast the position of a continuously operating moving body at a predetermined time with extremely high accuracy, and a position detection apparatus that includes the position forecasting apparatus.

Means for Solving the Problem

In order to resolve the above problem, the present invention provides a position forecasting apparatus for forecasting a position at a predetermined time of a continuously operating moving body, and the position forecasting apparatus is provided with an estimation part that finds an estimated position state of the moving body at a first time, which is earlier than the predetermined time, and a position forecasting part that forecasts the position of the moving body at the predetermined time based on the estimated position state of the moving body estimated by the estimation part.

Preferably, the above-described position forecasting apparatus is further provided with a calculation processing part that calculates the position state of the moving body based on signals relating to the position of the moving body output from a detection part, which detects an external magnetic field of a magnetic field generation part provided in the moving body, and a simulation part, which finds a simulated position state of the moving body at the first time based on the estimated position state of the moving body at a second time, which is more in the past than the first time, wherein the estimated position state of the moving body at the second time is estimated by the estimation part, and wherein the estimation part finds the estimated position state of the moving body at the first time based on the simulated position state found by the simulation part and the position state of the moving body at the first time calculated by the calculation processing part.

In the above-described position forecasting apparatus, preferably the position state of the moving body at the first time is the position state at the latest of the position states of the moving body calculated by the calculation processing part.

In the above-described forecasting apparatus, preferably the moving body is a rotationally moving body that rotates about a prescribed axis of rotation, and the estimation part finds estimated values of the rotational angle, angular speed and angular acceleration of the moving body at the position estimation time as the estimated position state.

In addition, preferably the present invention provides a position detection apparatus having the above-described position forecasting apparatus and a detection part that is positioned facing a magnetic field generation part provided in the moving body and that can detect the position of the moving body. In this position detection apparatus, preferably the detection part includes a magnetoresistive effect element.

Efficacy of the Invention

With the present invention, it is possible to provide a position forecasting apparatus that can forecast the position of a continuously operating moving body at a predetermined time with extremely high accuracy and a position detection apparatus that includes this position forecasting apparatus.

DETAILED DESCRIPTION OF THE INVENTION

Figure 1:
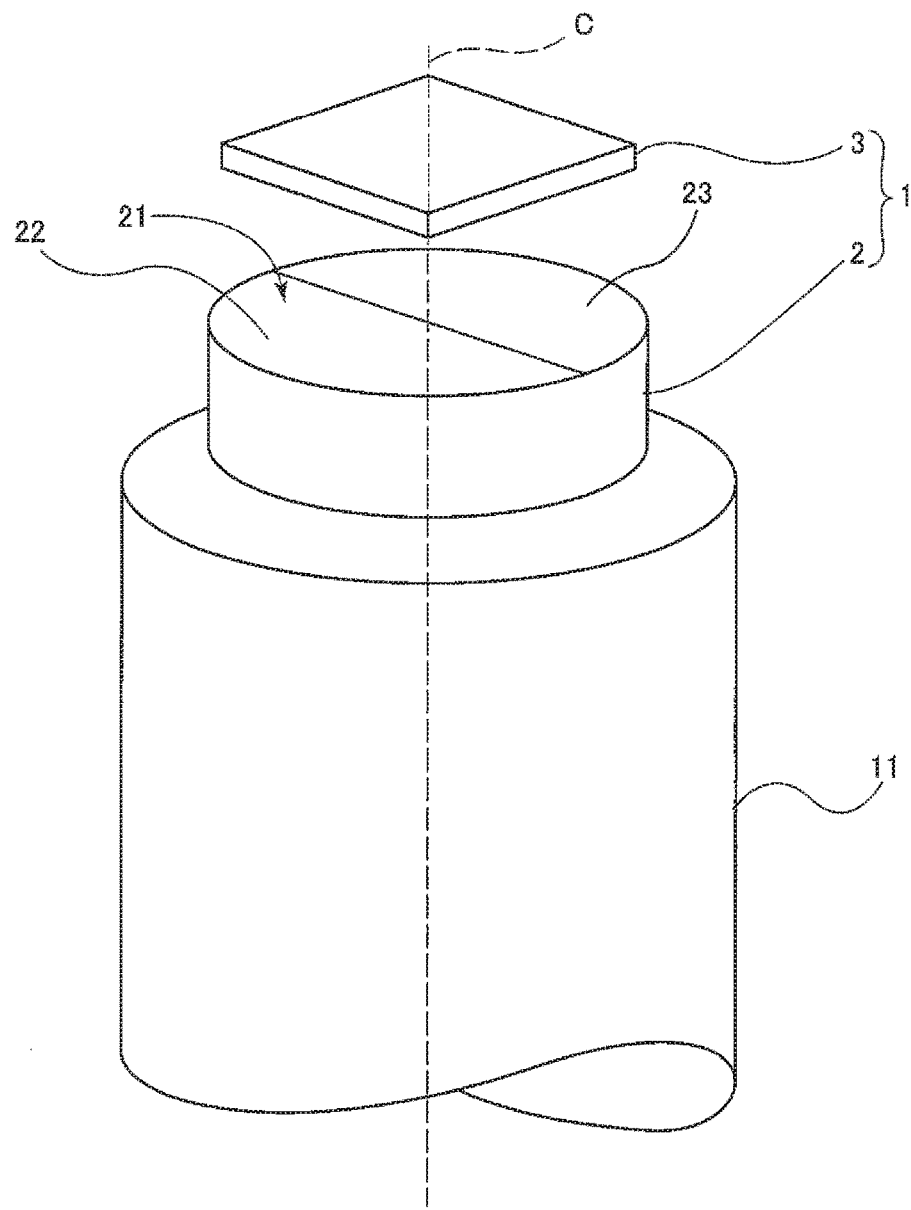
FIG. 1 is a perspective view showing a schematic configuration of a rotational angle detection apparatus according to an embodiment of the present invention.
Figure 3:
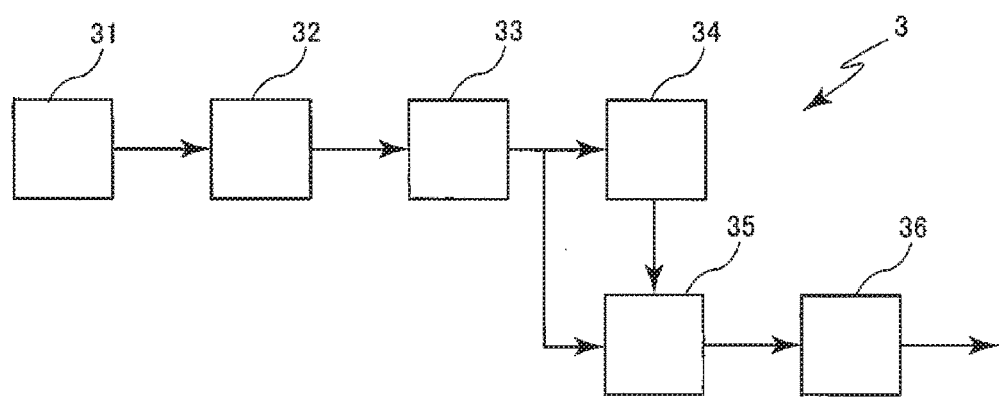
FIG. 3 is a block diagram showing a schematic configuration of the rotational angle detection apparatus according to the embodiment of the present invention.
Figure 4:
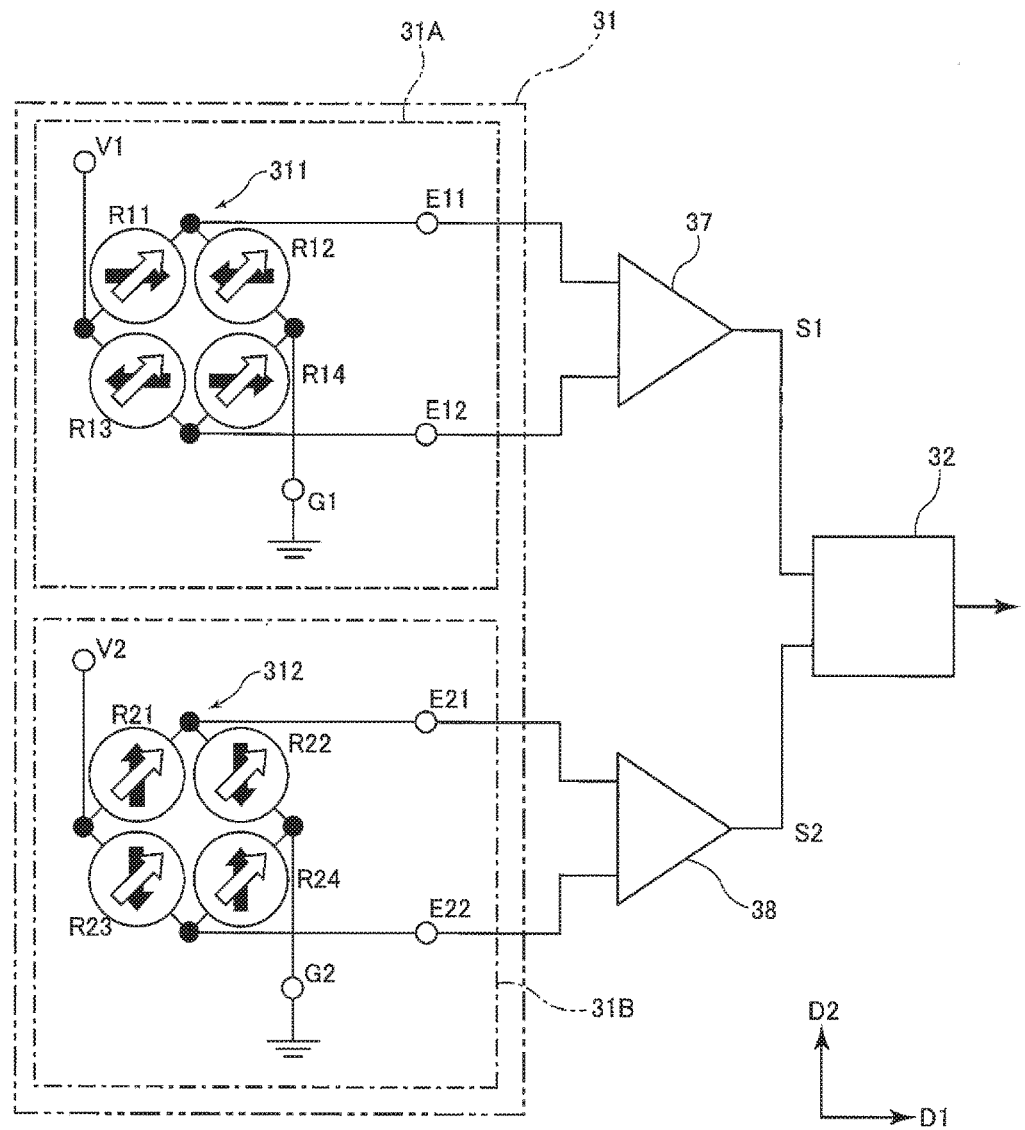
FIG. 4 is a circuit diagram schematically showing a circuit configuration of a detection part in the embodiment of the present invention.
Figure 5:
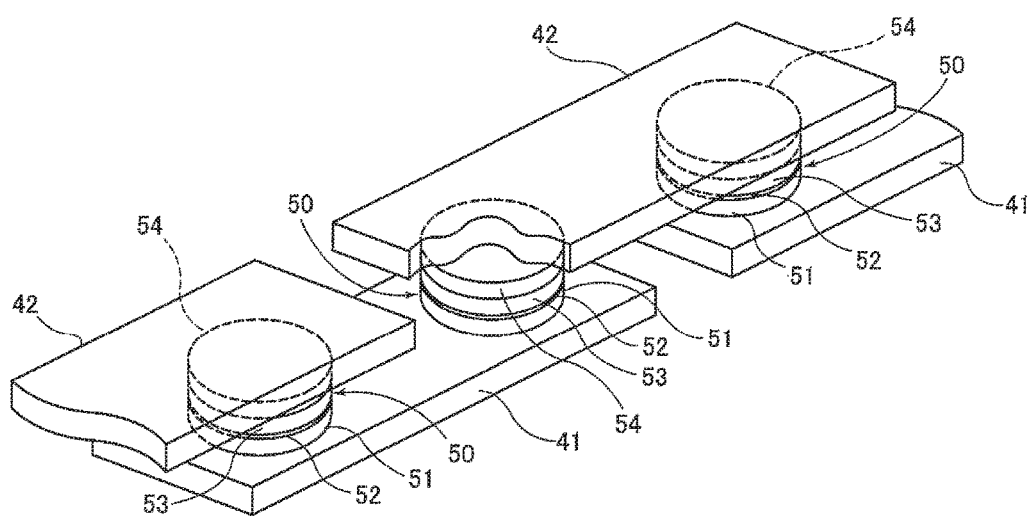
FIG. 5 is a perspective view showing a schematic configuration of an MR element as a magnetic detection element in the embodiment of the present invention.

The preferred embodiment of the present invention will be described in detail with reference to the drawings. FIG. 1 is a perspective view showing a schematic configuration of a rotational angle detection apparatus according to this embodiment, FIG. 2 is a side view showing a schematic configuration of the rotational angle detection apparatus according to this embodiment, FIG. 3 is a block diagram showing a schematic configuration of the rotational angle detection apparatus according to this embodiment, FIG. 4 is a circuit diagram schematically showing a circuit configuration of a detection part in this embodiment, and FIG. 5 is a perspective view showing a schematic configuration of an MR element as a magnetic detection element in this embodiment.

Figure 2:
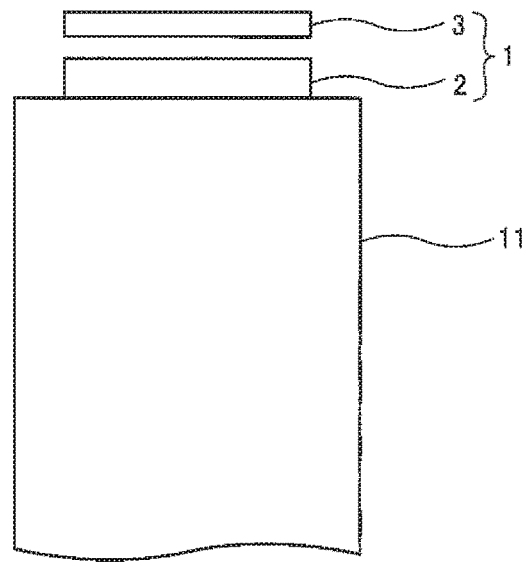
FIG. 2 is a side view showing a schematic configuration of the rotational angle detection apparatus according to the embodiment of the present invention.

As shown in FIG. 1 and FIG. 2, a rotational angle detection apparatus 1 according to this embodiment includes a magnet 2 and a magnetic detection apparatus 3 arranged opposite to the magnet 2. The magnet 2 is fixed to one end in the radial direction of a shaft part 11 (for example, a motor shaft or the like of a servo motor or the like) that rotates continuously about a rotational axis C, and rotates about the rotational axis C in conjunction with rotation of the shaft part 11.

The magnet 2 has an end surface 21, which is orthogonal to the rotational axis C. The magnet 2 has an N pole 22 and an S pole 23, which are arranged symmetrically about a virtual plane that includes the rotational axis C. The magnet 2 is magnetized in a direction orthogonal to the rotational axis C (a direction toward the N pole 22 from the S pole 23 and orthogonal to the boundary between the N pole 22 and the S pole 23). The magnet 2 generates a magnetic field based on the magnetization possessed by the magnet 2.

The magnetic detection apparatus 3 is arranged to face the end face 21 of the magnet 2, and detects the magnetic field from the magnet 2. The rotational angle detection apparatus 1 according to this embodiment can detect the rotational angle of the magnet 2, that is, the rotational angle of the shaft part 11 that moves rotationally, based on the output of the magnetic detection apparatus 3.

As shown in FIG. 3, the magnetic detection apparatus 3 has a detection part 31, an A/D (analog-digital) conversion part 32, a calculation processing part 33, a simulation part 34, an estimation part 35 and a forecasting part 36. The detection part 31 detects the magnetic field of the magnet 2 (see FIG. 1, FIG. 2). The A/D conversion part 32 converts the analog signal output from the detection part 31 into a digital signal. The calculation processing part 33 calculates the digital signal digitally converted by the A/D conversion part 32, and calculates a rotational angle θ. The simulation part 34 simulates the rotational angle $\theta_S$ at a prescribed sampling time based on a rotational angle $\theta_E$, angular speed $\omega_E$ and angular acceleration $\alpha_E$ estimated by the estimation part 35. The estimation part 35 estimates the rotational angle $\theta_E$, the angular speed $\omega_E$ and the angular acceleration $\alpha_E$ at the prescribed sampling time based on the rotational angle $\theta_S$ simulated by the simulation part 34 and the most recent rotational angle θ out of the rotational angles θ calculated by the calculation processing part 33. The forecasting part 36 forecasts a rotational angle $\theta_P$ at the present sampling time based on the estimation results (rotational angle $\theta_E$, angular speed $\omega_E$ and angular acceleration $\alpha_E$) from the estimation part 35. In this embodiment, a position forecasting apparatus capable of forecasting the position (rotational position) of the continuously operating moving body (for example, the motor shaft or the like of a continuously rotating servo motor) is configured by at least the calculation processing part 33, the simulation part 34, the estimation part 35 and the forecasting part 36.

As shown in FIG. 4, the detection part 31 includes a first detection part 31A and a second detection part 31B, and the first and second detection parts 31A and 31B each include at least one magnetic detection element. The detection part 31 generates and outputs detection signals (analog signals) relating to the angle (rotational angle) formed by the direction of the magnetic field of the magnet 2 with respect to a prescribed direction, at a prescribed sampling period (one sampling period is around 50~100 μsec, for example).

Each of the first and second detection parts 31A and 31B may include a pair of magnetic detection elements connected in series as at least one magnetic detection element. In this case, each of the first and second detection parts 31A and 31B has a Wheatstone bridge circuit that includes a first pair of magnetic detection elements connected in series, and a second pair of magnetic detection elements connected in series.

A Wheatstone bridge circuit 311 possessed by the first detection part 31A includes a power source port V1, a ground port G1, two output ports E11 and E12, a first pair of magnetic detection elements R11 and R12 connected in series, and a second pair of magnetic detection elements R13 and R14 connected in series. One end of each of the magnetic detection elements R11 and R13 is connected to the power source port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power source voltage of a prescribed size is impressed on the power source port V1, and the ground port G1 is connected to ground.

A Wheatstone bridge circuit 312 possessed by the second detection part 31B has the same composition as the Wheatstone bridge circuit 311 of the first detection part 31A, and includes a power source port V2, a ground port G2, two output ports E21 and E22, a first pair of magnetic detection elements R21 and R22 connected in series, and a second pair of magnetic detection elements R23 and R24 connected in series. One end of each of the magnetic detection elements R21 and R23 is connected to the power source port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power source voltage of a prescribed size is impressed on the power source port V2, and the ground port G2 is connected to ground.

In this embodiment, it is possible to use MR elements such as TMR elements, GMR elements or the like for all of the magnetic detection elements R11~R14 and R21~R24 included in the Wheatstone bridge circuits 311 and 312, and using TMR elements is particularly preferable. The TMR elements and the GMR elements have a magnetization fixed layer in which the magnetization direction is fixed, a free layer in which the magnetization direction changes in accordance with the direction of an impressed magnetic field, and a nonmagnetic layer arranged between the magnetization fixed layer and the free layer.

Specifically, as shown in FIG. 5, the MR element has a plurality of bottom electrodes 41, a plurality of MR films 50 and a plurality of top electrodes 42. The plurality of bottom electrodes 41 is provided on a substrate (unillustrated). Each of the bottom electrodes 41 has a long, slender shape. A gap is formed between two bottom electrodes 41 adjacent in the lengthwise direction of the bottom electrodes 41. The MR films 50 are respectively provided near both ends in the lengthwise direction on the top surface of the bottom electrodes 41. The MR films each include a free layer 51, a nonmagnetic layer 52, a magnetization fixed layer 53 and an antiferromagnetic layer 54, laminated in that order from the bottom electrode 41 side. The free layer 51 is electrically connected to the bottom electrode 41. The antiferromagnetic layer 54 is configured by antiferromagnetic materials, and by causing exchange coupling with the magnetization fixed layer 53, serves the role of fixing the direction of magnetization of the magnetization fixed layer 53. The plurality of top electrodes 42 is provided on the plurality of MR films 50. Each of the top electrodes 42 has a long, slender shape, is arranged on two of the bottom electrodes 41 adjacent in the lengthwise direction of the bottom electrodes 41, and electrically connects the antiferromagnetic layers 54 of two adjacent MR films 50 each other. The MR films 50 may have a configuration in which the free layer 51, the nonmagnetic layer 52, the magnetization fixed layer 53 and the antiferromagnetic layer 54 are laminated in that order from the top electrode 42 side. In addition, the antiferromagnetic layer 54 may be omitted by providing the magnetization fixed layer 53 with a so-called Synthetic Ferri Pinned layer (SFP layer)

having a laminated Ferri structure of ferromagnetic layer/nonmagnetic intermediate layer/ferromagnetic layer in which the two ferromagnetic layers are antiferromagnetically coupled.

In TMR elements, the nonmagnetic layer 52 is a tunnel bather layer. In GMR elements, the nonmagnetic layer 52 is a nonmagnetic conductive layer. In TMR elements and GMR elements, the resistance value changes in accordance with the angle formed by the direction of the magnetization of the free layer 51 with respect to the direction of magnetization of the magnetization fixed layer 53. The resistance value becomes a minimum when this angle is 0° (when the magnetization directions are mutually parallel), and the resistance value becomes a maximum when this angle is 180° (when the magnetization directions are mutually antiparallel).

In FIG. 4, the directions of magnetization of the magnetization fixed layers of the magnetic detection elements R11~R14 and R21~R24 are expressed by filled-in arrows, and the directions of magnetization of the free layers are expressed by outlined arrows. In the first detection part 31A, the direction of magnetization of the magnetization fixed layers of the magnetic detection elements R11 and R14 is a direction parallel to a first direction D1, and the direction of magnetization of the magnetization fixed layers of the magnetic detection elements R12 and R13 is an antiparallel direction to the direction of magnetization of the magnetization fixed layers of the magnetic detection elements R11 and R14. In the first detection part 31A, the electric potential difference between the output ports E11 and E12 changes in accordance with the strength of the component of the magnetic field of the magnetic 2 in the first direction D1, and a signal expressing the strength of the magnetic field of the magnet 2 in the first direction D1 is output.

In the second detection part 31B, the direction of magnetization of the magnetization fixed layers of the magnetic detection elements R21 and R24 is a second direction D2 (a direction orthogonal to the first direction D1), and the direction of magnetization of the magnetization fixed layers of the magnetic detection elements R22 and R23 is an antiparallel direction to the direction of magnetization of the magnetization fixed layers of the magnetic detection elements R21 and R24. In the second detection part 31B, the electric potential difference between the output ports E21 and E22 changes in accordance with the strength of the component of the magnetic field of the magnetic 2 in the second direction D2, and a signal expressing the strength of the magnetic field of the magnet 2 in the second direction D2 is output.

A difference detector 37 outputs a signal corresponding to the electric potential difference between the output ports E11 and E12 to the A/D conversion part 32 as a first signal S1. A difference detector 38 outputs a signal corresponding to the electric potential difference between the output ports E21 and E22 to the A/D conversion part 32 as a second signal S2.

As shown in FIG. 4, the magnetization direction of the magnetization fixed layers of the magnetic detection elements R11~R14 in the first detection part 31A and the magnetization direction of the magnetization fixed layers of the magnetic detection elements R21~R24 in the second detection part 31B are orthogonal to each other. In this case, the waveform of the first signal S1 becomes a cosine waveform dependent on the rotational angle θ, and the waveform of the second signal S2 becomes a sine waveform dependent on the rotational angle θ. In this embodiment, the phase of the second signal S2 differs from the phase of the first signal S1 by ¼ of a signal period by, that is, π/2 (90°).

The A/D conversion part 32 converts the first and second signals (analog signals related to the rotational angle θ) S1 and S2, output from the detection part 31 with a prescribed sampling period, into digital signals, and these digital signals are input into the calculation processing part 33.

The calculation processing part 33 accomplishes calculation processing on the digital signals converted from analog signals by the A/D conversion part 32, and calculates the rotational angle θ of the magnet 2. This calculation processing part 33 is configured by a microcomputer or the like, for example. The rotational angle θ of the magnet 2 calculated by the calculation processing part 33 is stored in a storage part (unillustrated) included in the calculation processing part 33.

The rotational angle θ of the magnet 2 can be calculated through an arctangent calculation shown in the below equation, for example.

$$\theta = a\tan(S1/S2)$$

Within a 360° range, there are 2 solutions of the rotational angle θ in the above equation, differing by 180°. However, through the combination of signs of the first signal S1 and the second signal S2, it is possible to determine which of the two solutions to the above equation is the true value of the rotational angle θ. That is, when the first signal S1 has a positive value, the rotational angle θ is larger than 0° and smaller than 180°. When the first signal S1 has a negative value, the rotational angle θ is larger than 180° and smaller than 360°. When the second signal S2 has a positive value, the rotational angle θ is within the range of 0° or more and less than 90° and larger than 270° and 360° or less. When the second signal S2 has a negative value, the rotational angle θ is larger than 90° and smaller than 270°. The calculation processing part 33 calculates the rotational angle θ within the 360° range based on the determination of the combination of signs of the first signal S1 and the second signal S2.

The simulation part 34 simulates a rotational angle $\theta_S$ of the magnet 2 at a prescribed sampling time from the rotational angle $\theta_E$, angular speed $\omega_E$ and angular acceleration $\alpha_E$ of the magnet 2 at a past sampling time estimated by the estimation part 35 and stored in the storage part. For example, the simulation part 34 can simulate the rotational angle $\theta_S$ of the magnet 2 at the prescribed sampling time by, for example, accomplishing extrapolation processing or the like about the rotational angle $\theta_E$ of the magnet 2 at a past sampling time estimated by the estimation part 35.

The estimation part 35 estimates the rotational angle $\theta_E$ of the magnet 2 at the prescribed sampling time and also estimates the angular speed $\omega_E$ and the angular acceleration $\alpha_E$, by reflecting the rotational angle θ of the magnet 2 at the prescribed sampling time on the rotational angle $\theta_S$ of the magnet 2 found by the simulation part 34.

The forecasting part 36 forecasts a rotational angle $\theta_P$ of the magnet 2 at the present sampling time based on the rotational angle $\theta_E$, the angular speed $\omega_E$ and the angular acceleration $\alpha_E$ of the magnet 2 estimated by the estimation part 35. For example, the forecasting part 36 calculates the rotational angle $\theta_P$ of the magnet 2 at the present sampling time by, for example, accomplishing extrapolation processing or the like about the rotational angle $\theta_E$ or the like of the magnet 2 estimated by the estimation part 35.

In the rotational angle detection apparatus 1 having the above-described configuration, when the magnet 2 rotates accompanying rotation of the shaft part 11, the magnetic field of the magnet 2 changes. The resistance values of the magnetic detection elements R11~R14 and R21~R24 of the detection part 31 change in accordance with changes in this magnetic field, and the signals S1 and S2 expressing the magnetic field strength of the magnet 2 in the first direction D1 and the second direction D2 are output from the difference detectors 37 and 38 at a prescribed sampling period, in accordance with the electric potential differences of the respective output ports E11, E12, E21 and E22 of the first detection part 31A and the second detection part 31B. Furthermore, the first signal S1 and the second signal S2 from the difference detectors 37 and 38 are outputted and are converted into digital signals by the A/D conversion part 32. Following this, the rotational angle θ of the magnet 2 is calculated by the calculation processing part 33.

In the rotational angle detection apparatus 1 according to this embodiment, delays arise from the filtering process about analog signals based on output from the detection part 31, the process of converting to digital signals by the A/D conversion part 32, the filtering process about the digital signals, the calculation process in the calculation processing part 33, and so forth. To make up for this delay, forecasting of the rotational angle by the forecasting part 36 becomes important.

For example, in the rotational angle detection apparatus 1 according to this embodiment, a delay of three sampling times arises from the various processes. Whereupon, at the present sampling time $T_n$, the rotational angle $θ_{n-3}$ of the magnet 2 at the third sampling time $T_{n-3}$ prior to the present sampling time $T_n$ is output by the calculation processing part 33. On the other hand, the simulation part 34 simulates and finds the rotational angle $θ_{Sn-3}$ of the magnet at the third sampling time $T_{n-3}$ prior to the present sampling time $T_n$, based on the rotational angle $θ_{En-4}$, the angular speed $ω_{En-4}$ and the angular acceleration $α_{En-4}$ of the magnet 2 at the fourth sampling time $T_{n-4}$ prior to the present sampling time $T_n$, which are estimated by the estimation part 35, for example. The estimation part 35 reflects the rotational angle $θ_{n-3}$ of the magnet calculated by the calculation processing part 33 (the most recent rotational angle of the magnet 2 at the present sampling time $T_n$) on the rotational angle $θ_{Sn-3}$ of the magnet 2 simulated by the simulation part 34 and estimates the rotational angle $θ_{En-3}$ of the magnet 2 at the third sampling time prior to $T_{n-3}$ and also estimates the angular speed $ω_{En-3}$ and the angular acceleration $α_{En-3}$. Furthermore, the forecasting part 36 forecasts the rotational angle $θ_{En-3}$ of the magnet 2 at the present sampling time $T_n$ based on the rotational angle $θ_{En-3}$, the angular speed $ω_{En-3}$ and the angular acceleration $α_{En-3}$ of the magnet 2 estimated by the estimation part 35.

Predetermined noise is included in the rotational angle θ of the magnet calculated by the calculation processing part 33. When attempting to forecast the rotational angle $θ_{Pn}$ at the present sampling time $T_n$ based on the rotational angle θ that includes this noise, the noise included in the forecast value of the rotational angle $θ_{Pn}$ that was forecasted is amplified, making correct forecasts difficult. In addition, in a forecasting method using the angular speed co and the angular acceleration a previously proposed by this inventor (Japanese Patent Application 2015-67498), reduction of the noise included in the forecast rotational angle $θ_{Pn}$ was possible, but there was a possibility that the forecast value of the rotational angle $θ_{Pn}$ would deviate from the rotational angle $θ_n$ calculated by the calculation processing part 33. In this forecast method, in a moving body rotationally moving at high speed, within an extremely short time (for example, around 3 sampling periods or less prior to the present sampling time $T_n$), the rotational movement of the magnet 2 is assumed to be constant speed rotational movement or constant acceleration rotational movement. Thus, assuming that the angular speed $ω_{n-3}$ and the angular acceleration $α_{n-3}$ at the third prior sampling time $T_{n-3}$ and the angular speed $ω_n$ and the angular acceleration $α_n$ at the present sampling time $T_n$ can be assumed to be substantially the same, and by forecasting the rotational angle $θ_{Pn}$ of the magnet 2 at the present sampling time $T_n$ based on the angular speed $ω_{n-3}$ and the angular acceleration $α_{n-3}$ calculated from the actually measured value of the rotational angle $θ_{n-3}$ of the magnet 2 at the third prior sampling time $T_{n-3}$ (the rotational angle $θ_{n-3}$ calculated by the calculation processing part), it is possible to reduce the noise included in the rotational angle $θ_{Pn}$. However, the rotational angle $θ_{n-3}$ at the third prior sampling time $T_{n-3}$ used in forecasting the rotational angle $θ_{Pn}$ of the magnet 2 at the present sampling time $T_n$ is an actually measured value (rotational angle $θ_{n-3}$ calculated by the calculation processing part 33), so it is conjectured that the problem arises that the rotational angle $θ_{Pn}$ forecast by the forecasting part 36 will deviate from the actually measured value.

On this point, in this embodiment, the rotational angle $θ_{En-3}$, the angular speed $ω_{En-3}$ and the angular acceleration $α_{En-3}$ at the third prior sampling time $T_{n-3}$ used in order to forecast the rotational angle $θ_{Pn}$ of the magnet 2 at the present sampling time $T_n$ are estimated values, so it is possible to resolve the problem of the rotational angle $θ_{Pn}$ forecast by the forecasting part 36 deviating from the rotational angle $θ_n$ calculated by the calculation processing part 33, and it is possible to extremely accurately forecast the rotational angle $θ_{Pn}$ of the magnet 2 at the present sampling time $T_n$.

In this manner, the rotational angle $θ_{Pn}$, of the magnet 2, which is forecasted with high accuracy by the forecasting part 36, is input into a driver circuit or the like (unillustrated) of the moving body including the shaft part 11 (for example, a servo motor or the like including a motor shaft), and movement control of the moving body is accomplished. Accordingly, it is possible to accomplish movement control of the moving body with high accuracy.

As described above, with the rotational angle detection apparatus 1 according to this embodiment, the rotational angle $θ_{En-3}$, the angular speed $ω_{En-3}$ and the angular acceleration $α_{En-3}$ used in order to forecast the rotational angle $θ_{Pn}$, at the present sampling time $T_n$ by the forecasting part 36 are found by reflecting the rotational angle $θ_{n-3}$ at the prior sampling time calculated by the calculation processing part 33 at the present sampling time $T_n$ on the rotational angle $θ_{Sn-3}$ simulated by the simulation part 34, so it is possible to extremely accurately forecast the rotational angle $θ_{Pn}$, at the present sampling time $T_n$ based on the rotational angle $θ_{En-3}$, the angular speed $ω_{En-3}$ and the angular acceleration $α_{En-3}$.

In addition, with the rotational angle detection apparatus 1 according to this embodiment, the rotational angle $θ_{En-3}$, the angular speed $ω_{En-3}$ and the angular acceleration $α_{En-3}$ estimated by the estimation part 35 in order to forecast the rotational angle $θ_{Pn}$ of the magnet 2 at the present sampling time $T_n$ are found only by using the most recent rotational angle $θ_{n-3}$ calculated by the calculation processing part 33 and the rotational angle $θ_{Sn-3}$ simulated by the simulation part 34, so an effect is achieved that can reduce the volume of information (number of samplings) necessary for forecasting the rotational angle $θ_{Pn}$.

The above-described embodiment was described to facilitate understanding of the present invention and is not intended to limit the present invention. Accordingly, each element disclosed in the above-described embodiment should be construed to include all design modifications and equivalents belonging to the technical scope of the present invention.

In the above-described embodiment, an example in which the forecasting part 36 forecasts the rotational angle $\theta_{Pn}$ at the present sampling time $T_n$, but this is intended to be illustrative and not limiting, and, for example, it would be fine to forecast the rotational angle $\theta_{Pn+3}$ in the future from the present sampling time $T_n$ (for example, the third sampling time ahead $T_{n+3}$).

In the above-described embodiment, the magnet 2 fixed to the shaft part 11 was used as the magnetic field generation part, but this is intended to be illustrative and not limiting. For example, it would be fine to use a magnet in which at least one group of N electrodes and S electrodes is positioned alternately in a ring shape as the magnetic field generation part and to position the magnetism detection apparatus facing the outer perimeter of this magnet, and it would be fine to use a linear scale as the magnetic field generation part.

In the above-described embodiment, the magnet 2 moves rotationally relative to the magnetic detection apparatus 3 by the shaft part 11 to which the magnet 2 is fixed rotating about the rotational axis C, but this is intended to be illustrative and not limiting. For example, the magnet 2 (shaft part 11) and the magnetic detection apparatus 3 may rotate in mutually opposite directions, or the magnetism detection apparatus 3 may rotate while the magnet 2 (shaft part 11) does not rotate.

EXAMPLES

Below, the present invention is described in greater detail by citing examples, but the present invention is not limited in any way to the below-described examples.

Example 1

Figure 6:
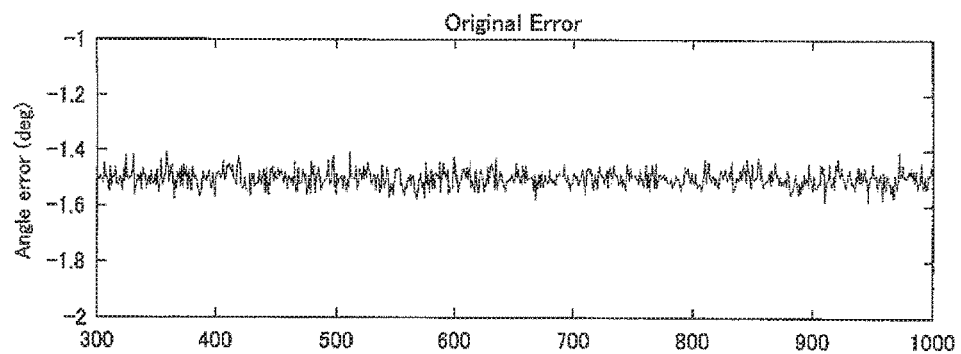
FIG. 6 is a graph showing noise in models of Example 1 and Comparison Examples 1~2.
Figure 7:
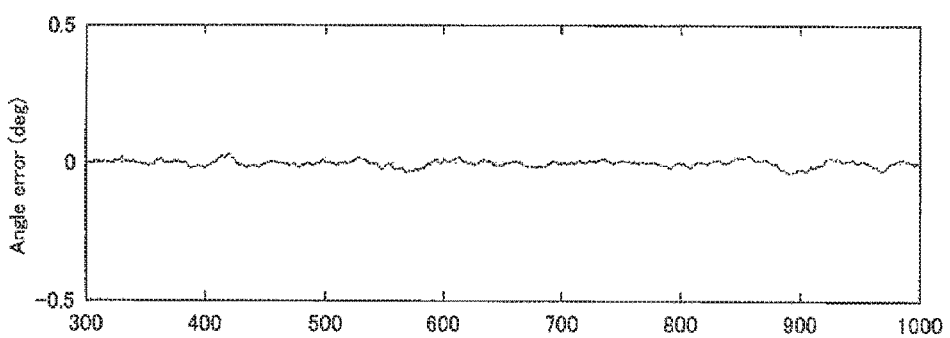
FIG. 7 is a graph showing simulation results in Example 1.

In relation to the forecast of the rotational angle $\theta_{Pn}$ at the present sampling time $T_n$ by the forecasting part 36 in the magnetic detection apparatus 3 having the configuration shown in FIG. 3 and FIG. 4, simulations were accomplished using MATLAB and noise included in the forecasted value of the rotational angle $\theta_{Pn}$ was found. In these simulations, it was assumed that the magnet 2 moves at a constant rotational speed of 10,000 deg/sec, the sampling period by the detection part 31 is 50 μsec, the noise included in the rotational angle $\theta$ calculated by the calculation processing part 33 is ±0.1 deg (see FIG. 6), and a group delay of three sampling times (150 μsec) occurs. In addition, it was assumed that the simulation part 34 simulates the rotational angle $\theta_{Sn-3}$ at the third prior sampling time $T_{n-3}$ through extrapolation processing using the rotational angle $\theta_{En-4}$, the angular speed $\omega_{En-4}$ and the angular acceleration $\alpha_{En-4}$ at the fourth prior sampling time $T_{n-4}$, the estimation part 35 estimates the rotational angle $\theta_{En-3}$, the angular speed $\omega_{En-3}$ and the angular acceleration $\alpha_{En-3}$ by reflecting the rotational angle $\theta_{n-3}$ at the third prior sampling time $T_{n-3}$ on the rotational angle $\theta_{Sn-3}$, and the forecasting part 36 forecasts the rotational angle $\theta_{Pn}$, through a linear extrapolation process using the estimated values of $\theta_{En-3}$, $\omega_{En-3}$ and $\alpha_{En-3}$. Simulation results are shown in FIG. 7.

Comparison Example 1

Figure 8:
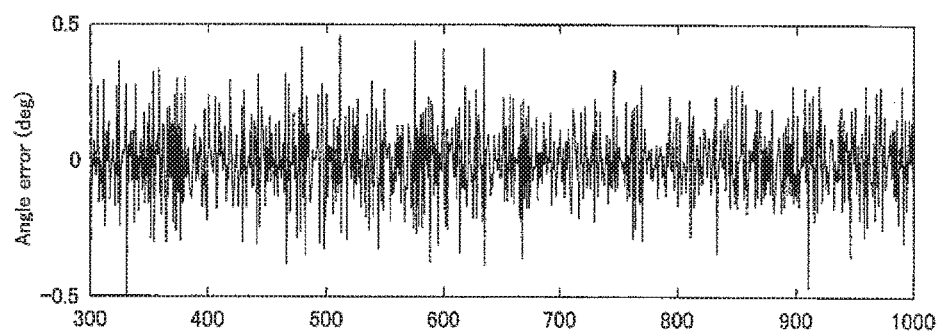
FIG. 8 is a graph showing simulation results in Comparison Example 1.

The noise included in the forecasted value of the rotational angle $\theta_{Pn}$ was found in the same manner as in Example 1 except that the measurement was performed. The rotational angle $\theta_{Pn}$ at the present sampling time $T_n$ was forecasted by accomplishing a linear extrapolation process using the rotational angles $\theta_{n-3}$~$\theta_{n-5}$ at three sampling times $T_{n-3}$~$T_{n-5}$ calculated by the calculation processing part 33. Simulation results are shown in FIG. 8.

Comparison Example 2

Figure 9:
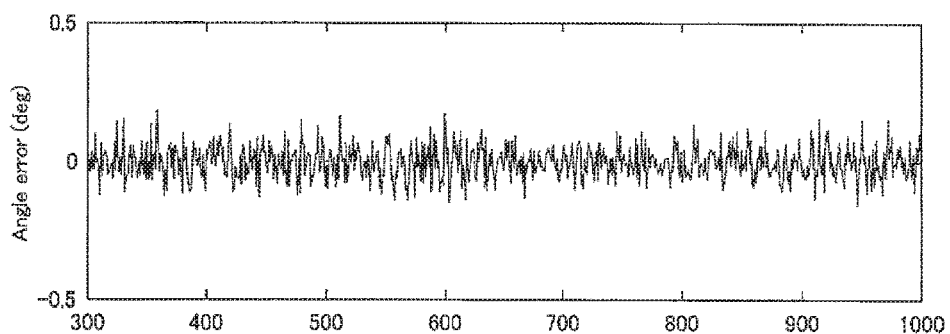
FIG. 9 is a graph showing simulation results in Comparison Example 2.

The noise included in the forecasted value of the rotational angle $\theta_{Pn}$ was found in the same manner as in Example 1 except that the rotational angle $\theta_{Pn}$ at the present sampling time $T_n$ was forecasted by accomplishing a moving average filter process using the angular speeds $\omega_{n-3}$~$\omega_{n-6}$ that are respectively the first derivative of the rotational angles $\theta_{n-3}$~$\theta_{n-6}$ at the four sampling times $T_{n-3}$~$T_{n-6}$. Simulation results are shown in FIG. 9.

As is clear from the results of Example 1, Comparison Example 1 and Comparison Example 2 (see FIGS. 7~9), it was confirmed that through forecasts using the rotational angle $\theta_{En-3}$, the angular speed $\omega_{En-3}$ and the angular acceleration $\alpha_{En-3}$ estimated by the estimation part 34, it is possible to extremely accurately forecast the rotational angle $\theta_{Pn}$ at the present sampling time $T_n$ without amplifying the noise, even if a predetermined amount of noise is included in the rotational angle $\theta$.

Example 2

Figure 10:
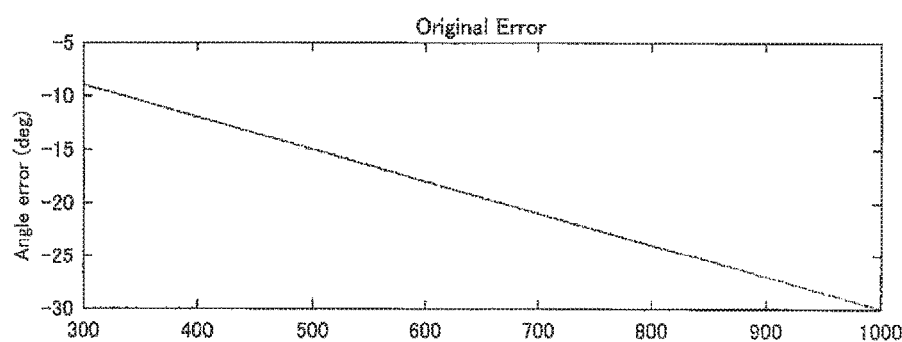
FIG. 10 is a graph showing noise in models of Example 2 and Comparison Examples 3~4.
Figure 11:
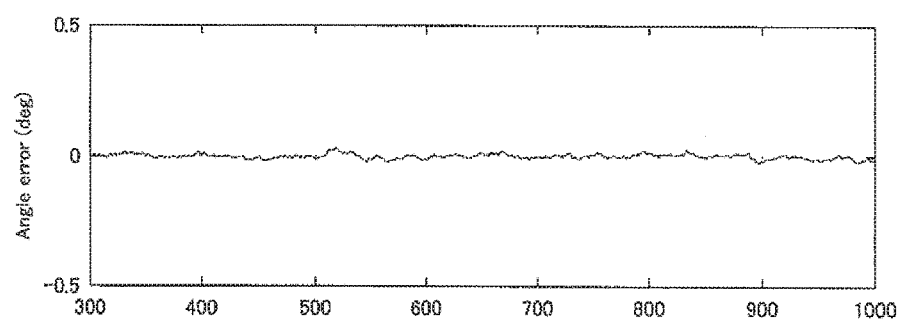
FIG. 11 is a graph showing simulation results in Example 2.

The noise included in the forecasted value of the rotational angle $\theta_{Pn}$ was found in the same manner as in Example 1. The magnet 2 was taken to be rotationally moving with a constant acceleration of $2\times10^8$ deg/sec$^2$, and the noise included in the rotational angle $\theta$ calculated by the calculation processing part 33 increased with larger speeds, as shown in FIG. 10. Results are shown in FIG. 11.

Comparison Example 3

Figure 12:
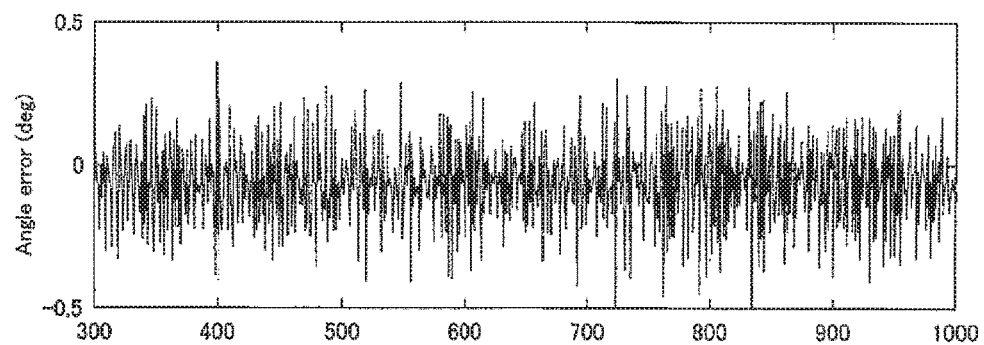
FIG. 12 is a graph showing simulation results in Comparison Example 3.

The noise included in the forecasted value of the rotational angle $\theta_{Pn}$ was found in the same manner as in Example 2 except that the rotational angle $\theta_{Pn}$ at the present sampling time $T_n$ is forecasted by accomplishing a linear extrapolation process using the rotational angles $\theta_{n-3}$~$\theta_{n-5}$ at the three sampling times $T_{n-3}$~$T_{n-5}$ calculated by the calculation processing part 33. The simulation results are shown in FIG. 12.

Comparison Example 4

Figure 13:
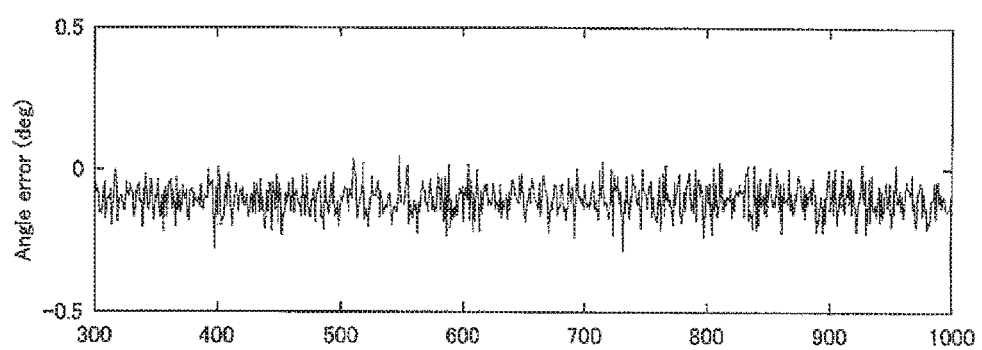
FIG. 13 is a graph showing simulation results in Comparison Example 4.
Figure 14:
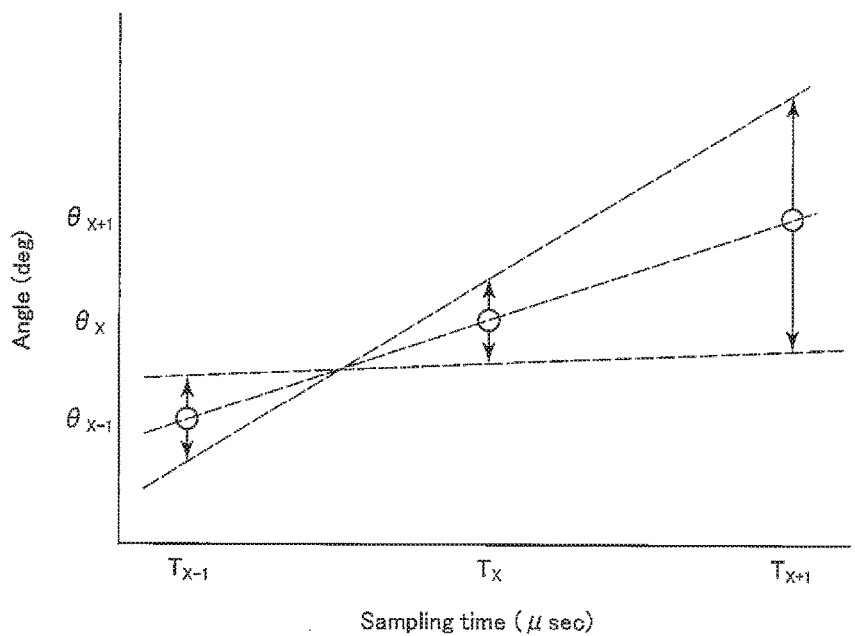
FIG. 14 is a graph for explaining that noise included in forecast values is amplified in a linear forecasting model that uses angle data including noise.

The noise included in the forecasted value of the rotational angle $\theta_{Pn}$ was found in the same manner as in Example 2 except that the rotational angle $\theta_{Pn}$ at the present sampling time $T_n$ is forecasted by accomplishing a moving average filter process using the angular accelerations $\alpha_{n-3}$~$\alpha_{n-6}$ that are respectively the second derivative of the rotational angles $\theta_{n-3}$~$\theta_{n-6}$ at the four sampling times $T_{n-3}$~$T_{n-6}$. The simulation results are shown in FIG. 13.

As is clear from the results of Example 2, Comparison Example 3 and Comparison Example 4 (see FIGS. 11~13), it was confirmed that through forecasts using the rotational angle $\theta_{En-3}$, the angular speed $\omega_{En-3}$ and the angular acceleration $\alpha_{En-3}$ estimated by the estimation part 34, it is possible to extremely accurately forecast without amplifying the noise, even if a predetermined amount of noise is included in the rotational angle $\theta$, and without the forecast value of the rotational angle $\theta_{Pn}$ at the present sampling time $T_n$ deviating from the true value (the rotational angle $\theta_n$ calculated by the calculation processing part 33).

DESCRIPTION OF REFERENCE SYMBOLS

1 Rotational angle detection apparatus (position detection apparatus)
2 Magnet (magnetic field generation part)
3 Magnetism detection apparatus
31 Detection part
33 Calculation processing part
34 Simulation part
35 Estimation part
36 Forecasting part

The invention claimed is:

1. A position forecasting apparatus for forecasting a position at a predetermined time of a continuously operating moving body, the position forecasting apparatus comprising:
   an estimation part that finds an estimated position state of the moving body at a first time, which is earlier than the predetermined time;
   a position forecasting part that forecasts the position of the moving body at the predetermined time based on the estimated position state of the moving body estimated by the estimation part;
   a calculation processing part that calculates the position state of the moving body based on signals relating to the position of the moving body output from a detection part that detects an external magnetic field of a magnetic field generation part provided in the moving body; and
   a simulation part that finds a simulated position state of the moving body at the first time based on the estimated position state of the moving body at a second time, which is more in the past than the first time, wherein the estimated position state of the moving body at the second time is estimated by the estimation part,
   wherein the estimation part finds the estimated position state of the moving body at the first time based on the simulated position state found by the simulation part and the position state of the moving body at the first time calculated by the calculation processing part.

2. The position forecasting apparatus according to claim 1, wherein the position state of the moving body at the first time is the position state at the latest of the position states of the moving body calculated by the calculation processing part.

3. The position forecasting apparatus according to claim 1, wherein:
   the moving body is a rotationally moving body that rotates about a predetermined axis of rotation; and
   the estimation part finds estimated values of the rotational angle, angular speed and angular acceleration of the moving body at the position estimation time as the estimated position state.

4. A position detection apparatus, comprising:
   the position forecasting apparatus according to claim 1; and
   a detection part that is positioned to face a magnetic field generation part provided on the moving body and that can detect the position of the moving body.

5. The position detection apparatus according to claim 4, wherein the detection part includes a magnetoresistive effect element.

* * * * *